*Huntoon & Simonds,*
*Tap Wrench.*

No. 111,647. Patented Feb. 7, 1871.

Witnesses.
Albert M. Moore.
Abel T. Atherton.

Inventors.
George W. Huntoon
Edwin Simonds

United States Patent Office.

GEORGE W. HUNTOON AND EDWIN SIMONDS, OF LOWELL, MASSACHUSETTS.

Letters Patent No. 111,647, dated February 7, 1871.

IMPROVEMENT IN TAP-WRENCHES.

The Schedule referred to in these Letters Patent and making part of the same.

We, GEORGE W. HUNTOON and EDWIN SIMONDS, both of Lowell, in the county of Middlesex and Commonwealth of Massachusetts, have invented certain Improvements in Wrenches, of which the following is a specification.

Our invention relates to the construction of adjustable jaws, (in connection with the wrench-plate,) which are operated in such a manner as to hold firmly the tap or other article when in use, without injury to said tap where the same comes in contact with said jaws, and also to be readily detached from said tap when the same is not in use, one pair of said jaws being adjustable to many sizes of taps; and It consists—

First, in the covering-plates, which are fashioned to retain the jaws in place, and also to receive the thrust in one direction of the thumb-nuts; and Secondly, in the construction of the jaws with overlapping parts, to preserve a complete socket however much distended.

Figure 1:
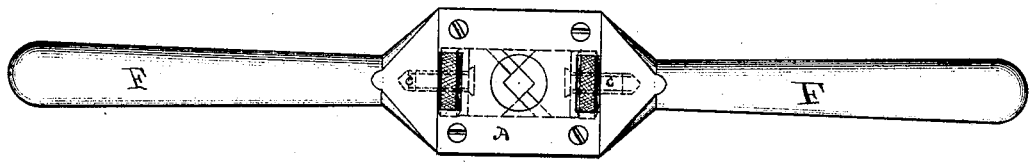
Figure 1 is a plan view of our invention.
Figure 2:
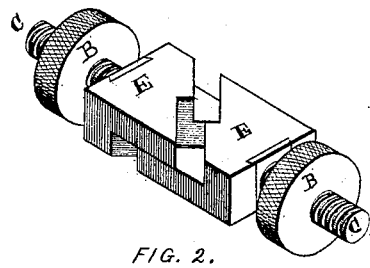
Figure 2 is an oblique view of the jaws and screws connected therewith.

A is one of two plates, exactly alike, and disposed on both sides of the wrench. Said plates serve the purpose of preventing the jaws slipping out of the wrench-plate, of shoulders for the screws for moving the jaws, and also as a means of strengthening the sides of the frame.

B B are two thumb-nuts, which, by working on screws C C, communicate the required motion to the jaws E E. Said jaws are exactly alike, and so made that when in operation one portion of each overlaps the other, said overlapping giving to said jaws a greater strength and bearing-surface against the inside edge of the rectangular hole in the wrench-plate, thus combining utility with strength.

F F are the two handles of the wrench-plate, said wrench-plate having through its center a rectangular hole for the accommodation of the jaws; extending from each end of said rectangular hole to a short distance into said handles are two holes, drilled for the accommodation of the screws connected to the jaws.

We claim as our invention—

1. The plates A, constructed and arranged to retain the jaws E in place, and to resist the thrust of the thumb-nuts B, as set forth.

2. The adjustable overlapping jaws E E, constructed and arranged substantially in the manner and for the purpose set forth.

GEORGE W. HUNTOON.
EDWIN SIMONDS.

Witnesses:
ALBERT M. MOORE,
ABEL T. ATHERTON.